United States Patent [19]
Davis et al.

[11] 3,940,163
[45] Feb. 24, 1976

[54] VEHICLE FOR TRAVERSING ROUGH TERRAIN

[75] Inventors: Leo W. Davis; Marion D. Lackey; John Reuben Ross; Bryant Trenary, all of Dallas, Tex.

[73] Assignee: Marion Power Shovel Company, Inc., Marion, Ohio

[22] Filed: Aug. 12, 1974

[21] Appl. No.: 496,720

Related U.S. Application Data

[63] Continuation of Ser. No. 395,535, Sept. 10, 1973, abandoned, which is a continuation of Ser. No. 67,901, Aug. 28, 1970, abandoned.

[52] U.S. Cl............................................. 280/106 R
[51] Int. Cl.²......................................... B62D 21/00
[58] Field of Search....... 280/106 R, 106 A; 180/9.5

[56] References Cited
UNITED STATES PATENTS

| | | | |
|---|---|---|---|
| 1,479,348 | 1/1924 | Wickerman.......................... | 180/9.5 |
| 2,311,880 | 2/1943 | Sherman.......................... | 280/106 R |
| 2,988,159 | 6/1961 | Weber.................................. | 180/9.5 |

*Primary Examiner*—Robert R. Song
*Attorney, Agent, or Firm*—Richards, Harris and Medlock

[57] ABSTRACT

A vehicle for traversing rough terrain, such as is commonly found in open mining operations and highway construction work. The vehicle is characterized by a movable frame structure. The frame includes a pair of elongated side members which are joined in a spaced apart relationship near the rear of the frame members by a first crossmember which is provided with a pivotal joint to permit the side members to rotate or pivot relative to each other. The front ends of the side members are connected by second and third crossmembers, each of which is pivotally connected at both ends to the side members to provide lateral restraint to the side members while the vehicle is traversing rough terrain. The second and third crossmembers are vertically displaced to prevent relative rotation of the side members about their longitudinal axes while permitting up and down movement of the forward ends of the side members as the side members rotate about the pivot point in the first crossmember.

18 Claims, 6 Drawing Figures

INVENTORS:
**BRYANT TRENARY
MARION D. LACKEY
JOHN R. ROSS
LEO W. DAVIS**

*Richards, Harris & Hubbard*
ATTORNEYS

INVENTORS:
BRYANT TRENARY
MARION D. LACKEY
JOHN R. ROSS
LEO W. DAVIS

Richards, Harris & Hubbard
ATTORNEYS

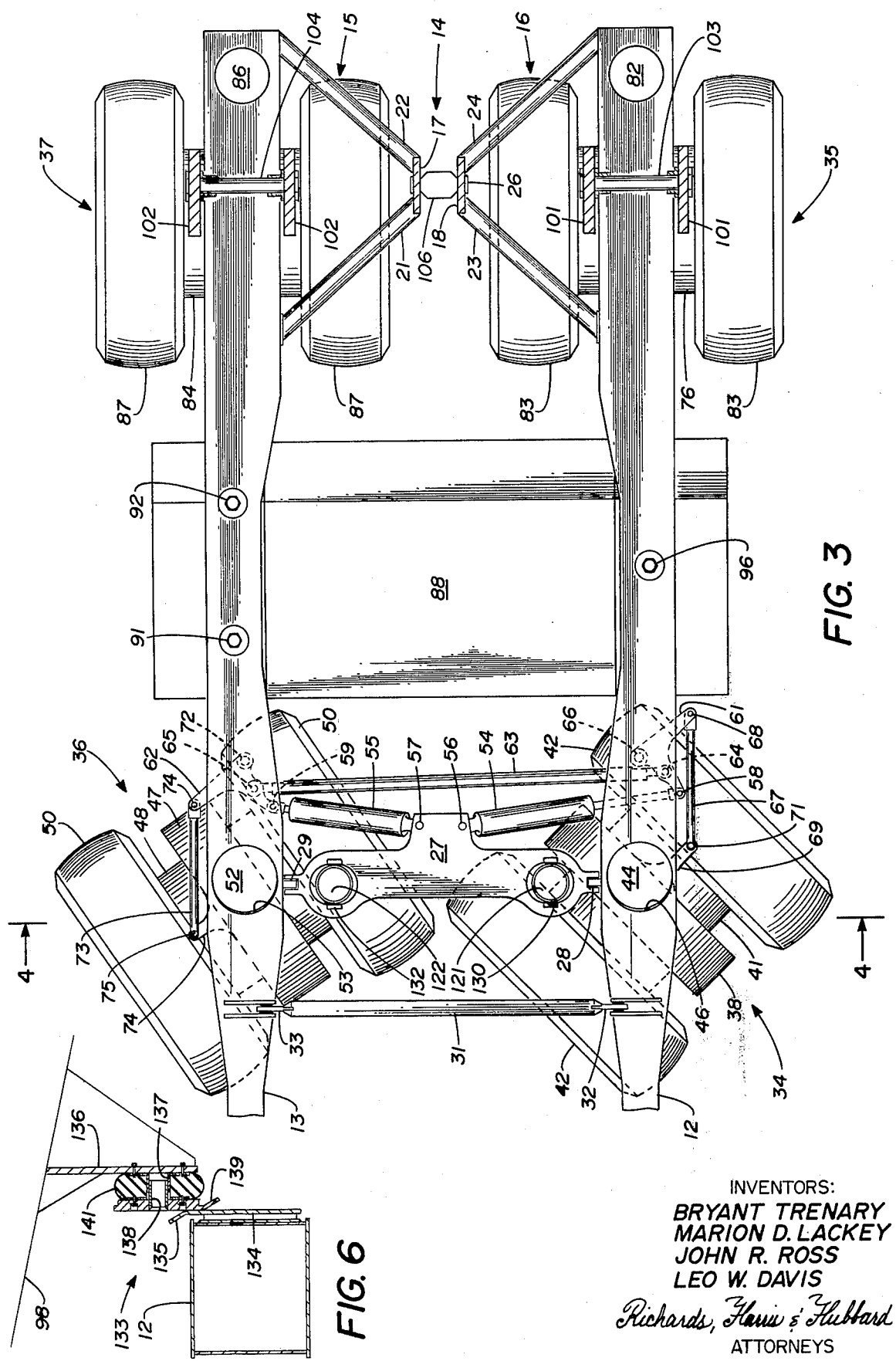

VEHICLE FOR TRAVERSING ROUGH TERRAIN

RELATED APPLICATION

This is a continuation of application Ser. No. 395,535 filed Sept. 10, 1973, which was a continuation of application Ser. No. 67,901 filed Aug. 28, 1970, both of which are now abandoned.

BACKGROUND OF THE INVENTION

1. Field of the Invention:

This invention relates to vehicles capable of traversing rough terrain, and more particularly to vehicles having frame structures which are capable of moving relative to the body being supported when the vehicle encounters rough terrain.

2. Description of Prior Art:

Many vehicles are designed to traverse rough terrain. Some unevenness in the terrain is usually accommodated by providing a suspension system for each of the wheel assemblies, or other ground engaging members, to permit the wheel assemblies to move relative to the vehicle, which is normally provided with a rigid frame to which the suspension systems are attached.

However, even with conventional suspension assemblies, the wheel assemblies and frame may be subjected to excessive loading. Consider, for example, a vehicle having a conventional rigid frame, suspension system and four dual tire assemblies, one of the dual tire assemblies being positioned at each of the corners of the vehicle. If one of the tires of the assembly passes over a large rock or the like, the wheel will rise causing the entire weight normally borne by both tires to be borne by only one of the tires, and then only on the area which is in engagement with the rock. The tires must thus be designed to absorb these anticipated loads, which, obviously, far exceed the normal operating loads.

If, for example, both tires of one of the dual assemblies encounters a very high spot then the opposite dual assembly may be lifted significantly or completely clear of the ground. In this instance the dual assembly in engagement with the ground will support up to twice its normal load, and the tires must be designed accordingly.

Further, if large irregularities are encountered, the limits of the suspension systems may be reached. Loads transmitted through the suspension systems must be absorbed by the vehicle and generate stresses in the frame. The frame therefore must be designed to absorb dynamic loading far in excess of normal loading. Thus, with vehicles employing pneumatically inflated tires, the tires must be designed to withstand loads which greatly exceed the normal operating load, and frame structures must likewise be designed to accommodate stresses which greatly exceed the normal stresses which will exist in the frames when the suspension systems are operating within limits.

Thus, the tires and frame assemblies must be designed to accommodate loading which greatly exceeds the normal loading, and the cost and size of both of these components could be reduced if it were not necessary to design for greater than normal loading when rough terrain is to be encountered by the vehicle.

SUMMARY OF THE INVENTION

The present invention provides a vehicle which, due to a unique frame design, prevents buildup of stresses, compressive, tensional and torsional, in the frame assembly during travel of the vehicle over rough terrain thus permitting significant reduction in the size of the structural members comprising the frame. Additionally the frame permits more even loading of the wheel assemblies over wider ranges of deflection so a given wheel and suspension assembly can operate over a greater range of load limits. The frame of the present invention may be generally characterized as including a pair of elongated side members which are joined by a first crossmember in a spaced apart relationship. The first crossmember has a pivotal portion to permit the side members to rotate relative to each other in planes parallel to their longitudinal axes. There may also be provided a second crossmember which is pivotally joined at its ends to the side members to permit limited rotation of the side members while providing lateral restraint thereon. A frame assembly so constructed may move when the vehicle encounters rough terrain thus reducing stresses which would be inherently created if the frame assembly were rigid, as is conventional.

BRIEF DESCRIPTION OF THE DRAWINGS

An embodiment of the invention is illustrated in the drawings. In the drawings:

FIG. 3 is a partial, top plan view generally taken along line 3—3 of FIG. 2;

FIG. 6 is a partial cross-sectional view taken along line 6—6 of FIG. 1.

DESCRIPTION OF THE PREFERRED EMBODIMENT

One particular type of vehicle which is normally employed in rough terrain is the vehicle commonly characterized as a "Dump Truck". Dump trucks are used in off-highway work such as mining for removal of overburden materials as well as the ore to be refined, and such vehicles are also typically found in highway and dam construction work in removing and transporting earth from one location to another.

These vehicles are commonly very large as they are employed to transport very heavy loads. Thus, the conventional rigid frame assemblies which have been used in the past have been very massive to take the static and dynamic loading which will be placed on the frame during movement of the dump truck over rough terrain. Also, the suspension systems for the wheel assemblies of the dump truck have necessarily been quite massive to absorb as much of the energy from movement of the wheel assemblies as possible. The greater the weight of the frame assemblies and suspension systems of a commercial vehicle, such as a dump truck, the less payload may be hauled with a given size power plant, thus the less economical is the vehicle.

Figure 1:
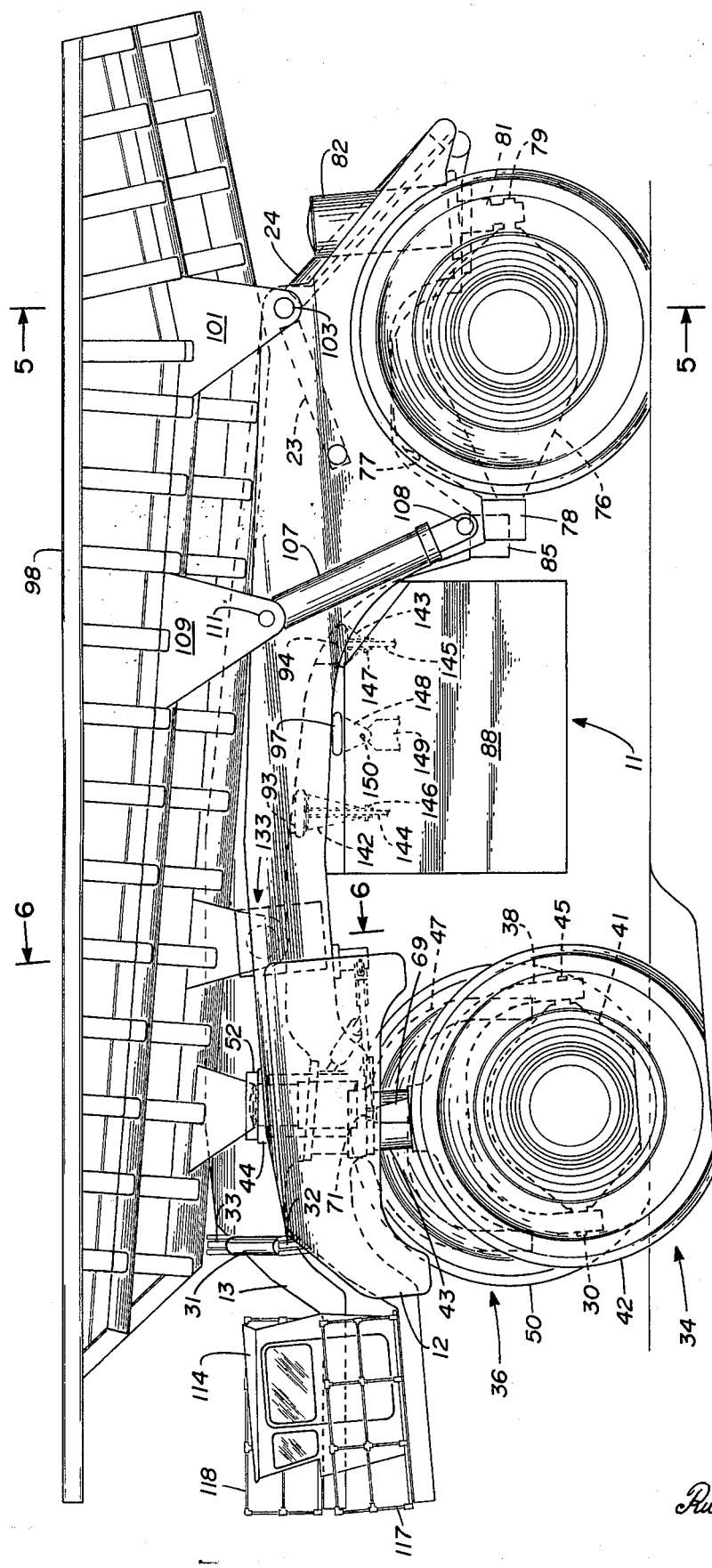
FIG. 1 is a side elevational view of a dump truck which embodies the present invention.

The vehicle in FIG. 1 has a unique frame assembly which permits better distribution of loads and thus employs smaller size structural members.

With particular reference to FIGS. 1 and 3, the dump truck 11 includes a pair of elongated side members 12 and 13 which are joined near the rearwardly oriented ends thereof by a first crossmember, generally indicated by the reference numeral 14. Crossmember 14 includes two V-shaped struts 15 and 16 the apices 17 and 18 of which, respectively, are positioned in a confronting relationship. Strut 15 has a downwardly and forwardly extending leg 21 and a downwardly and rearwardly extending leg 22, both of which are affixedly attached to side member 13 in any conventional manner. Similarly, strut 16 has a forwardly and downwardly extending leg 23 and a downwardly and rearwardly extending leg 24, both of which are attached to side member 12 in any conventional manner, such as by weldment to rods 19 and 21 which are affixed to side members 12 and 13, respectively. Struts 15 and 16 are pivotally joined at their apices 17 and 18 by pin 26 thus permitting side members 12 and 13 to rotate relative to each other in planes parallel to their longitudinal axes. To provide lateral restraint to the side members 12 and 13 upon movement thereof, the forwardly oriented ends thereof are joined by a second crossmember 27. Crossmember 27 is pivotally connected to side members 12 and 13 by clevis, tongue and pin connections 28 and 29, respectively. Thus, fairly uniform spacing will be maintained between the ends of members 12 and 13. Preferably, the second crossmember 27 is also assisted in providing lateral restraint by a third crossmember 31 the ends of which are pivotally attached to side members 12 and 13 by tongue, clevis and pin assemblies 32 and 33, respectively. As is particularly obvious in FIG. 2, the second crossmember 27 and third crossmember 31 are vertically displaced thus forming, with side members 12 and 13, a parallelogram bracing arrangement which will permit limited movement of the forward ends of side members 12 and 13 up and down as side members 12 and 13 rotate about pin 26. The parallelogram bracing arrangement also prevents relative rotation of side members 12 and 13 about their longitudinal axes in the event that any torsional loading is imparted to side members 12 and 13. Side member 12 has mounted thereto front and rear wheel assemblies 34 and 35, while side member 13 has mounted thereto front and rear assemblies 37 and 36. Front wheel assembly 34 includes a yoke 38 which pivotally receives therebetween hub assembly 41 of an electrically powered set of motorized wheels 42. The hub assembly 41, as particularly illustrated in FIG. 2 and in phantom line in FIG. 1 is pivotally mounted to yoke 41 by spindles 30 and 45 to permit the hub 38 and wheels 42 to pivot about an axis parallel to the path of travel of the vehicle.

Figure 2:
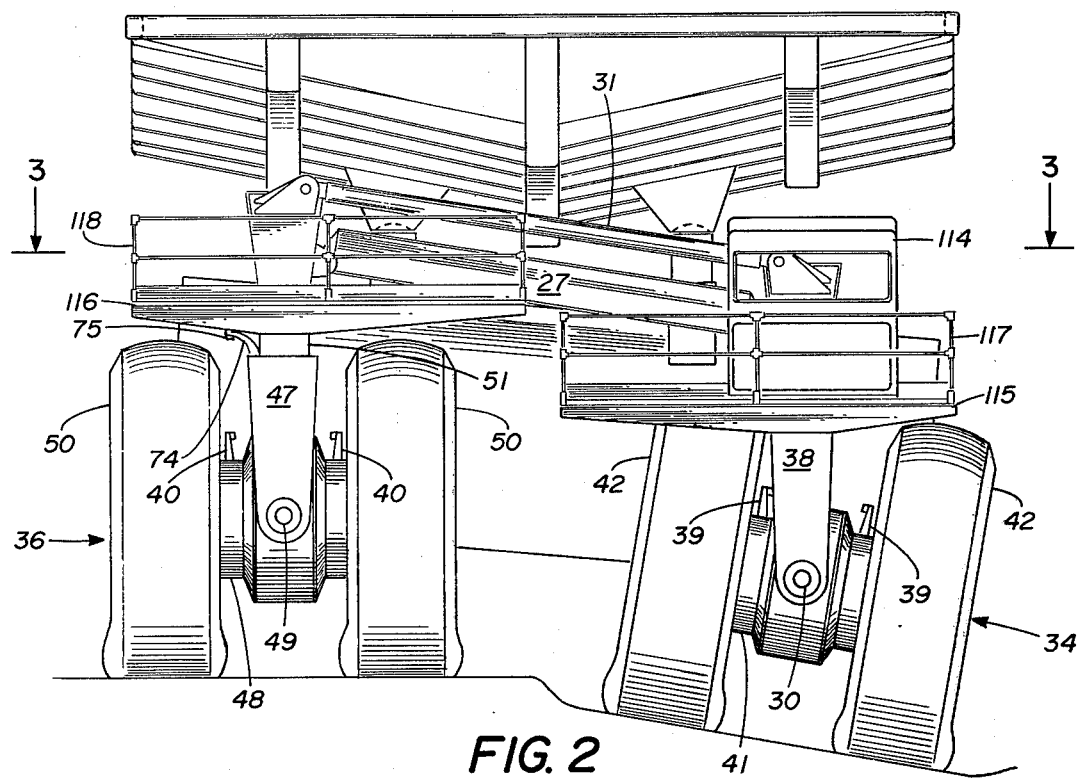
FIG. 2 is a front elevational view of the vehicle illustrated in FIG. 1.

Yoke 38 also has an upstanding spindle 43 which is received within a suspension assembly 44. Assembly 44 is positioned within an opening 46 in side member 12, to which it is securely fastened by any conventional means. Thus, spindle 43 may reciprocate within suspension assembly 44 as the wheel assembly 34 encounters rough terrain. The opposite front wheel assembly 36 is likewise provided with a yoke 47 within which is pivotally mounted a hub 48 of electrically powered wheels 50. Hub 48, as particularly illustrated in FIG. 2 is pivotally mounted to yoke 47 by a pair of spindles, only spindle 49 of which is illustrated. Yoke 47 also has an upstanding spindle 51 which is received within a suspension assembly 52, suspension assembly 52 being positioned within opening 53 in side member 13, to which suspension assembly 52 is rigidly attached.

The front wheel assemblies 34 and 36 are provided with a steering system employing the "Ackerman" principle which includes oppositely acting hydraulic cylinder and ram assemblies 54 and 55, the cylinder portions of which are affixed to crossmember 27 by pins 56 and 57, respectively. The opposite ends of cylinder and ram assemblies 54 and 55 are connected by pins 58 and 59, respectively, to bell cranks 61 and 62, the movements of which are coordinated by a tie-rod 63. The ends of tierod 63 are connected to bell crank 61 by pin 64 and to bell crank 62 by pin 65. Bell crank 61 is rotatably pinned to side member 12 by pin 66 and upon rotation of bell crank 61 about pin 66 will effect movement of wheel assembly 34 through a linkage arm 67 one end of which is attached to bell crank 61 by a pin 68 and the other end of which is connected to an upstanding arcuate tongue 69 by a ball and socket connection 71.

The opposite bell crank 62 is similarly pinned to side member 13 by pin 72. Upon rotation of bell crank 62 about pin 72 movement of wheel assembly 36 will be effected through linkage arm 73 which is attached to bell crank 62 by pin 74 and to the upstanding arcuate tongue 70 of yoke 47 by a conventional ball and socket attachment 75.

The left rear wheel assembly 35 is provided with a hub portion 76, illustrated in phantom line in FIG. 1 which is received within a recess 77 in side member 12. The forward end of hub 76 is pivotally mounted within a journal 78 while the rear end of the hub 76 is pivotally mounted through spindle 79 to the ram portion 81 extending from suspension assembly 82 which is affixed to side member 12. To permit up and down movement of ram 81 within suspension assembly 82 upon contact of wheel assembly 35 with irregularities in the terrain, journal 78 is pivotally mounted within side member 12 by any suitable means (not illustrated).

Hub 76 has attached thereto dual electric wheels 83.

The opposite rear wheel assembly 37 is provided with a hub 84 the forward end of which is received within a journal 85 which, like journal 78, is pivotally received within a side member, in this case side member 13, by any conventional means (not illustrated). The rear of hub 84, like hub 76, is attached through a spindle (not illustrated) to the ram of suspension assembly 86. Hub 84 also supports a pair of electric wheels 87. Power for the wheel assemblies 34–37 may be derived from a conventional engine and generator system supported within module 88 which is suspended from side members 12 and 13. To permit movement of side member 12 relative to side member 13 about the pin 26 in crossmember 14 without imparting undue stresses in module 88, module 88 is attached to side member 13 by bolts 91 and 92 which pass through side member 13 and support, through rubber rings 93 and 94, brackets 142 and 143. Brackets 142 and 143 pivotally receive arms 144 and 145 attached to module 88, to which they are connected by pins 146 and 147.

Figure 4:
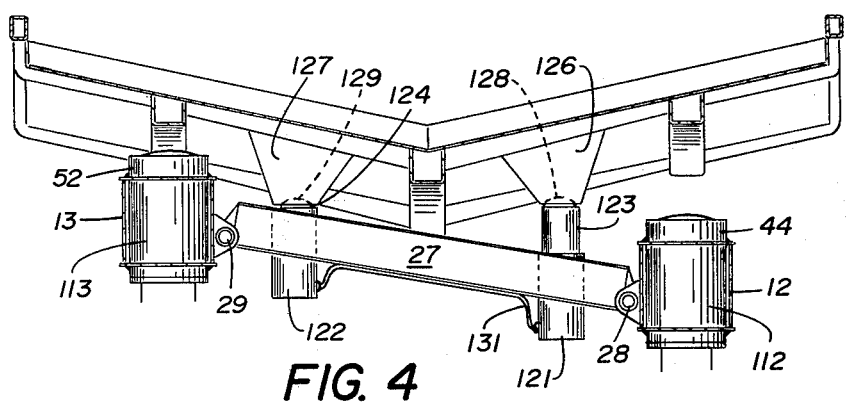
FIG. 4 is a cross-sectional view taken along line 4—4 of FIG. 3.
Figure 5:
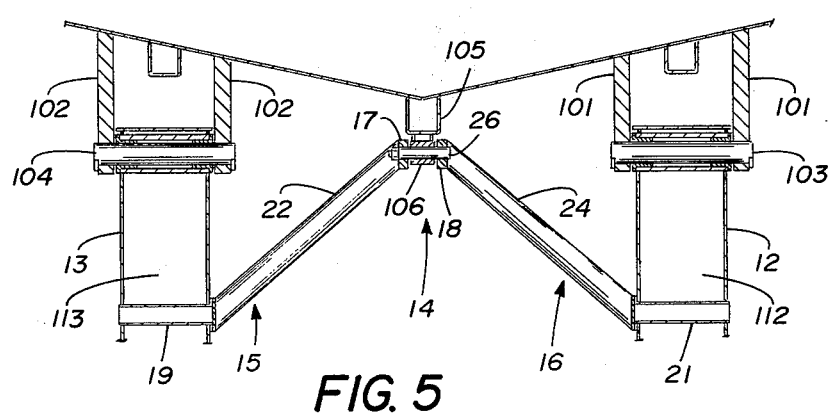
FIG. 5 is a cross-sectional view taken along line 5—5 of FIG. 1.

The opposite end of module 88 is secured to side member 12 by a bolt 96 which passes downwardly through side member 12 for attachment, through a rubber ring 97, to a bracket 148. Bracket 148 pivotally receives and is pinned by pin 150 to an arm 149 which is attached to module 88. A dump box 98 is supported for pivotal movement on side members 12 and 13 through a first pair of downwardly extending ears 101 and a second pair of downwardly extending ears 102, respectively. Ears 101 are pivotally mounted to side member 12 by a pin 103 and ears 102 are pivotally attached to side member 13 by a pin 104. The dump box 98 also has a depending ear 105, the sleeve portion 106 of which is positioned between the apices 17 and 18 of struts 15 and 16, respectively, to receive pin 26 therethrough. The pins 103, 104 and 26 have a common axis thus permitting the dump box to be elevated by a cylinder and ram assembly 107 on each of the side members, only one of which is illustrated. The cylinder and ram assembly 107 attached to side member 12 is pivotally attached thereto by a pin 108 and has its opposite end attached to depending ears 109 of the box 98 by a pin 111. Power for the cylinder and ram assemblies 107 is derived from a hydraulic pump situated within module 88 through lines which pass within side members 12 and 13 which, as illustrated in FIGS. 4 and 5, have open passageways 112 and 113, respectively. Control of the wheel assemblies 34–37, steering cylinders 54 and 55 and lift cylinders 107 may be effected through a suitable conventional control system located in cab 114, which is supported on a platform 115 attached to side member 12. A similar platform 116 is attached to side member 13, and each is provided with safety rails 117 and 118, respectively. The forward end of dump box 98 is supported by a pair of hydraulic leveling assemblies 121 and 122 having ram portions 123 and 124 which engage brackets 126 and 127, respectively, depending from dump box 98. The brackets 126 and 127 have concave recesses 128 and 129 which receive the convex ends of rams 123 and 124. The leveling cylinders 121 and 122 intercommunicate through a hydraulic line 131 to permit equalization of the pressures within the leveling cylinders 121 and 122, and the assemblies 121 and 122 are pivotally mounted within crossmember 27 by pins 130 and 132, as illustrated in FIG. 3, to permit the assemblies to remain in a vertical position upon movement of one of the side members relative to the other side member.

To assure that the dump box 98 is properly aligned with side members 12 and 13 upon lowering of the dump box by assemblies 107, the side members 12 and 13 and dump box 98 are provided with cooperating guide members generally indicated by the reference numeral 133, as particularly illustrated in FIG. 6. Side member 12 has attached to the interior wall thereof a spacer plate 134 which supports a ski-shaped guideplate 135. The dump box 98 has a suitably braced depending plate 136 to which is attached an annular ring 137. Received within ring 137 is a smaller ring 138 to which is affixed an oppositely pointed ski-shaped plate 139. Bonded between plates 139 and 136 is a resilient ring 141. As the dump box 98 is lowered the tips of plates 135 and 139 will, assuming dump box 98 is too far to the left (as viewed in FIG. 6), engage and cause the dump box to move inwardly for correct positioning of box 98 between side members 12 and 13, as side member 13 is fitted with an identical guide mechanism.

In operation, if wheel assembly 34 is traveling over terrain which is lower than the area being traversed by wheel assembly 36, the side member 12 will move down by pivoting about the pin 26 in crossmember 14. The crossmembers 27 and 31 will retain the vertical alignment of side members 12 and 13. As side member 12 is permitted to lower or move downward when the wheel assembly 34 is traversing lower terrain than that of wheel assembly 36 no undue stresses are created in the frame or in the suspension system and thus the structural members need not be of the size of a conventional rigid frame vehicle. As the side members 12 and 13 will move slightly inwardly as one moves up or down relative to the other, due to the parallelogram bracing arrangement, the resilient rings 141 in the dump box guide members 133 will be compressed. The sleeves 137 and 138 are so dimensioned that upon excessive movement of dump box 98 toward one of the side members 12 or 13, the sleeves 138 and 137 will reach their fully telescoped position causing sleeve 138 to abut plate 136 and sleeve 137 to abut plate 139 to prevent crushing of the resilient ring 141. Further, as the side member 12 moves down relative to side member 13, as illustrated in FIGS. 1 and 2 particularly, the end of module 88 viewed in FIG. 1 will move downwardly relative to the opposite end causing arms 144 and 145 to pivot within brackets 142 and 143, respectively. As the front of side member 12 will also tilt downwardly, as viewed in FIG. 1, arm 149 will pivot in bracket 148, thus minimizing the creation of stresses in module 88.

Further, as particularly illustrated in FIG. 4, as side member 12 moves downwardly, the load borne by ram member 124 of hydraulic leveler assembly 122 will increase causing hydraulic fluid to flow through line 131 into hydraulic leveler assembly 121 thereby extending the ram 123 to maintain the dump box 98 in a level position and avoid shifting of the load in the dump box 98.

If the terrain under wheel assembly 34 is also inclined relative to the transverse axis of the vehicle, as illustrated in FIG. 2, the wheels may oscillate about spindle 30 to assure that each of the dual tire assemblies 42 is supporting approximately the same amount of weight thus preventing undesirable loading of one of the tires. Yoke 38 is provided with stops 39 which limit the degree of rotation and yoke 47 is provided with similar stops 40. As the forwardly oriented ends of side members 12 and 13 may move up and down relative to each other as rough terrain is encountered by wheel assemblies 34 and 36, relatively little stress is created in side members 12 and 13 or crossmembers 14, 27 and 31. Further, the loading of each of the side members 12 and 13 will remain relatively constant and need not be designed to bear excessive loads, as is the case in the design of conventional rigid frames. Further, as the loads because of the movement of side members 12 and 13 will be relatively uniformly distributed over the tire assemblies 34–37, the suspension of tire assemblies need not be greatly over designed as the load conditions will remain relatively constant regardless of the nature of the terrain.

As the various components of the illustrated and described vehicle need not be designed to accommodate loads significantly larger than normal operating loads they may be made smaller and lighter in weight thus permitting the hauling of larger payloads in dump box 98 for a given power plant size, thus increasing the efficiency and economy of operating the vehicle.

While the embodiment illustrated and described is the preferred embodiment, various modifications may be made therein without departing from the scope of the invention. For example, the struts 15 and 16 may be eliminated and dump box 98 employed as the first crossmember as it would serve to maintain side members 12 and 13 in a spaced apart relationship and permit one to rotate relative to the other. Preferably, however, additional bracing across the rearwardly oriented ends of members 12 and 13 is provided, and it may take other forms than that illustrated and described. Other types of steering systems could also be employed, and the power for the wheel assemblies 34–37 could be mechanical rather than electrical. Further, leveling of the dump box 98 may be effected by mounting the leveler assemblies 121 and 122 on side members 12 and 13, and mechanical as well as hydraulic leveling could be employed. Also the lifting assemblies 107 could be used separately or in combination with load levelers 121 and 122 to maintain dump box 98 in a level position.

While rather specific terms have been used to describe one embodiment of the invention, they should not be construed nor are they intended to be limiting upon the invention, which is defined by the following claims.

What is claimed is:

1. A vehicle capable of traversing rough terrain, which vehicle includes a frame comprising:
   a pair of elongated side members;
   a first crossmember joining said side members in a spaced apart relationship and having a pivotal portion to permit said side members to rotate relative to each other in parallel planes; and
   a second crossmember also joining said side members in a spaced apart relationship, each end of said second crossmember being pivotally connected to one of said side members to permit limited rotation of said side member while providing lateral restraint on the side member, and said second crossmember being unattached to structure which would limit its vertical and horizontal displacement during rotation of said side members as said vehicle traverses rough terrain.

2. The vehicle of claim 1 including:
   a third crossmember also joining said side members in a spaced apart relationship, each end of said third crossmember being pivotally connected to one of said side members to assist said second crossmember in providing lateral restraint on the side members during rotation, the points of connection of said third crossmember to said side members being vertically displaced from the points of connection of said second crossmember to said side members to prevent relative rotation of said side members about their longitudinal axes.

3. The vehicle of claim 1 wherein the first crossmember comprises:
   a pair of V-shaped struts the apices of which are positioned in a confronting relationship between said side members and the legs of which are attached to the side members; and
   means pivotally joining the apices of the struts.

4. The vehicle of claim 3 wherein each of said V-shaped struts has one leg attached to one of said side members forwardly of the pivotal axis of the first crossmember and the other leg attached to said side member rearwardly of the pivotal axis of the first crossmember.

5. The vehicle of claim 4 wherein both of the legs of the struts are attached to the side members below the pivotal axis of the first crossmember.

6. The apparatus of claim 1 wherein said frame also includes:
   load leveling assemblies carried by said frame which are adapted to maintain a load carried by said frame in a level position when one of said side members rotates relative to the other side member.

7. The apparatus of claim 6 wherein said load leveling assemblies are carried by said second crossmember.

8. A vehicle capable of traversing rough terrain, which vehicle includes a frame having:
   a pair of elongated, generally parallel side members;
   a first crossmember joining said side members near the rearwardly oriented ends of said side members, the first crossmember having a pivotal portion to permit the forwardly oriented ends of said side members to move up and down; and
   a second crossmember pivotally joined at each end to the side members near the forwardly oriented ends of the side members to permit up and down movement of said forwardly oriented ends while providing lateral restraint during the movements thereof, said second crossmember being unattached to structure which would limit its vertical and horizontal displacement during rotation of said side members as said vehicle traverses rough terrain.

9. The vehicle of claim 8 including:
   a third crossmember pivotally joined at each end to said side members near the forwardly oriented ends of said side members to permit up and down movement of said forwardly oriented ends and assist said second crossmember in providing lateral restraint on the side members, the points of connection of the third crossmembers to the side members being above or below the points of connection of the second crossmember to the side members to prevent relative rotation of said side members about their longitudinal axes.

10. A vehicle capable of traversing rough terrain, which vehicle concludes:
   a pair of elongated side members;
   a pair of V-shaped struts, the apices of which are positioned in a confronting relationship between said side members and the legs of which are attached to the side members; and
   means pivotally joining the apices of the struts.

11. The vehicle of claim 10 wherein each of said V-shaped struts has one leg attached to one of said side members forwardly of the pivotal axis of the first crossmember and the other leg attached to said side member rearwardly of the pivotal axis of the first crossmember.

12. The vehicle of claim 11 wherein both of the legs of the struts are attached to the side members below the pivotal axis of the first crossmember.

13. The apparatus of claim 8 wherein said frame also includes:
   load leveling assemblies carried by said frame which serve to maintain a load carried by said frame in a level position when one of said side members rotates relative to the other side member.

14. The apparatus of claim 13 wherein said load leveling assemblies are carried by said second crossmember.

15. A vehicle capable of traversing rough terrain, which vehicle includes a frame comprising:
   a pair of elongated side members supporting a body thereon;
   a first crossmember interconnecting said side members, including means permitting said side members to pivot relative to each other about a transverse axis; and
   a second crossmember interconnecting said side members, each end of said second crossmember being pivotally connected to one of said side members to permit limited pivotal movement of said side members relative to said transverse axis while providing lateral restraint thereon, said second crossmember being disposed apart from and movable independently of said body supported on said side members.

16. The vehicle of claim 15 including:
a third crossmember also joining said side members in a spaced apart relationship, each end of said third crossmember being pivotally connected to one of said side members to assist said second crossmember in providing lateral restraint on the side members during rotation, the points of connection of said third crossmember to said side members being vertically displaced from the points of connection of said second crossmember to said side members to prevent relative rotation of said side members about their longitudinal axes.

17. A vehicle capable of traversing rough terrain, which vehicle includes a frame comprising:
a pair of elongated, generally parallel side members supporting a body thereon;
a first crossmember interconnecting said side members near the rearwardly oriented ends of said side members, including means permitting said side members to pivot relative to each other about a transverse axis; and
a second crossmember interconnecting said side members near the forwardly oriented ends of the side members, each end of said second crossmember being pivotally connected to one of said side members to permit limited pivotal movement of said side members relative to said transverse axis while providing lateral restraint thereon, said second crossmember being disposed apart from and movable independently of said body supported on said side members.

18. The vehicle of claim 17 including:
a third crossmember pivotally joined at each end to said side members near the forwardly oriented ends of said side members to permit up and down movement of said forwardly oriented ends and assist said second crossmember in providing lateral restraint on the side members, the points of connection of the third crossmembers to the side members being above or below the points of connection of the second crossmember to the side members to prevent relative rotation of said side members about their longitudinal axes.

* * * * *